(12) United States Patent
Shin (10) Patent No.: US 8,359,300 B1
(45) Date of Patent: Jan. 22, 2013

(54) SYSTEM AND METHOD FOR DISPLAYING BOTH LOCALIZED SEARCH RESULTS AND INTERNET SEARCH RESULTS

(75) Inventor: David D. Shin, New York, NY (US)

(73) Assignee: Google Inc., Mountain View, CA (US)

( * ) Notice: Subject to any disclaimer, the term of this patent is extended or adjusted under 35 U.S.C. 154(b) by 298 days.

(21) Appl. No.: 11/696,161

(22) Filed: Apr. 3, 2007

(51) Int. Cl.
*G06F 7/00* (2006.01)
*G06F 17/30* (2006.01)

(52) U.S. Cl. .................................. 707/706; 707/640

(58) Field of Classification Search .............. 707/3, 1, 707/2, 4, 6, 7, 208; 715/764, 738
See application file for complete search history.

(56) References Cited

U.S. PATENT DOCUMENTS

| | | | |
|---|---|---|---|
| 6,377,961 B1 * | 4/2002 | Ryu ........................... | 1/1 |
| 6,381,603 B1 * | 4/2002 | Chan et al. .................. | 1/1 |
| 6,385,602 B1 * | 5/2002 | Tso et al. .................... | 1/1 |
| 6,601,061 B1 * | 7/2003 | Holt et al. ................... | 1/1 |
| 6,625,595 B1 * | 9/2003 | Anderson et al. ........... | 1/1 |
| 6,691,103 B1 * | 2/2004 | Wozny ........................ | 1/1 |
| 6,839,705 B1 * | 1/2005 | Grooters ..................... | 1/1 |
| 6,925,378 B2 * | 8/2005 | Tzamaloukas .............. | 701/200 |
| 7,024,364 B2 * | 4/2006 | Guerra et al. ............... | 704/270 |
| 7,035,911 B2 * | 4/2006 | Lowery et al. .............. | 709/217 |
| 7,219,090 B2 * | 5/2007 | Travis, Jr. ................... | 1/1 |
| 7,231,405 B2 * | 6/2007 | Xia ............................. | 1/1 |
| 7,373,246 B2 * | 5/2008 | O'Clair ....................... | 701/208 |
| 7,386,540 B2 * | 6/2008 | Anderson et al. ........... | 1/1 |
| 7,424,472 B2 * | 9/2008 | Wang et al. ................. | 1/1 |
| 7,437,353 B2 * | 10/2008 | Marmaros et al. .......... | 1/1 |
| 7,444,343 B2 * | 10/2008 | Wang et al. ................. | 1/1 |
| 7,467,356 B2 * | 12/2008 | Gettman et al. ............. | 715/850 |
| 7,475,072 B1 * | 1/2009 | Ershov ........................ | 1/1 |
| 7,483,881 B2 * | 1/2009 | Egnor et al. ................. | 1/1 |
| 7,499,914 B2 * | 3/2009 | Diab et al. .................. | 1/1 |
| 7,634,484 B2 * | 12/2009 | Murata ........................ | 1/1 |
| 7,769,737 B2 * | 8/2010 | Leahy et al. ................. | 707/705 |
| 2002/0038348 A1 * | 3/2002 | Malone et al. .............. | 709/217 |
| 2003/0061211 A1 * | 3/2003 | Shultz et al. ................ | 707/3 |
| 2004/0139049 A1 * | 7/2004 | Hancock et al. ............ | 707/1 |
| 2005/0080788 A1 * | 4/2005 | Murata ........................ | 707/10 |
| 2005/0091193 A1 * | 4/2005 | Frank et al. ................. | 707/1 |
| 2005/0262062 A1 * | 11/2005 | Xia ............................. | 707/3 |
| 2007/0112777 A1 * | 5/2007 | Field et al. .................. | 707/10 |
| 2008/0104027 A1 * | 5/2008 | Imler et al. .................. | 707/3 |
| 2010/0017865 A1 * | 1/2010 | Leahy et al. ................. | 726/7 |
| 2010/0114959 A1 * | 5/2010 | Shirakawa .................. | 707/781 |

* cited by examiner

*Primary Examiner* — Pierre Vital
*Assistant Examiner* — Taelor Kim
(74) *Attorney, Agent, or Firm* — Morgan, Lewis & Bockius LLP (57) ABSTRACT

A method of presenting search results includes sending to a server a search query, wherein the search query does not include any term that identifies a geographic location, and receiving a set of search results corresponding to a search query. The search results include first results and second results. The first results match the search query. Each first result corresponds to one or more locations associated with a respective geographic location and include links to additional information about the one or more locations. The respective geographic location is associated with a client or a user of the client. The second results correspond to Internet accessible documents that satisfy the search query and include links to the Internet accessible documents that satisfy the search query. The method further includes presenting the first results and second results in a single web browser window.

24 Claims, 9 Drawing Sheets

Figure 5B

SYSTEM AND METHOD FOR DISPLAYING BOTH LOCALIZED SEARCH RESULTS AND INTERNET SEARCH RESULTS

TECHNICAL FIELD

The disclosed embodiments relate generally to the presentation of search results, and in particular, to a system and method of searching and presenting results related to local search results.

BACKGROUND

Internet search engines allow users to search for and find an abundance of information related to virtually any topic. Typically, a user submits a search query using key terms and the search engine returns various search results matching that search query. The search results are produced and displayed according to various criteria that the search engine developer has created. Often, the search results encompass a wide variety of documents and are not categorized according to any particular criteria. Typically, the search results are produced without regard to a user's location. If the user desires search results that are based on a particular location, the user must also include the location in the search query.

SUMMARY OF EMBODIMENTS

In accordance with some embodiments of the present invention, a computer implemented method of presenting search results includes sending to a server a search query, wherein the search query does not include any term that identifies a geographic location, and receiving a set of search results corresponding to a search query. The search results include first results and second results. The first results match the search query. Each first result corresponds to one or more locations associated with a respective geographic location and include links to additional information about the one or more locations. The respective geographic location is associated with a client or a user of the client. The second results correspond to Internet accessible documents that satisfy the search query and include links to the Internet accessible documents that satisfy the search query. The method further includes presenting the first results and second results in a single web browser window.

In accordance with some embodiments of the present invention, a computer implemented method of presenting search results includes receiving from a client a search query, wherein the search query does not include any term that identifies a geographic location, and sending to a client a set of search results corresponding to a search query. The search results include first results and second results. The first results match the search query. Each first result corresponds to one or more locations associated with a respective geographic location and includes links to additional information about the one or more locations. The respective geographic location is associated with a client or a user of the client. The second results correspond to Internet accessible documents that satisfy the search query and include links to the Internet accessible documents that satisfy the search query.

In accordance with some embodiments of the present invention, a computer implemented method of presenting search results includes receiving from a client a search query, wherein the query does not include any term that identifies a geographic location, searching a primary database to generate a primary set of search results, comparing the search query against one or more lists of terms associated with a secondary database, and when the comparison meets a predefined criteria, searching the secondary database to generate a secondary set of search results that match the search query. The secondary search results correspond to one or more locations associated with a respective geographic location and include links to additional information about the one or more locations. The respective geographic location is associated with a client or a user of the client. The method further includes sending at least a subset of the primary set of search results and at least a subset of the secondary set of search results to the client.

In accordance with some embodiments of the present invention, a computer implemented method of presenting search results includes receiving from a client a search query, wherein the query does not include any term that identifies a geographic location, searching a primary database to generate a primary set of search results that match the search query, and determining whether a geographic location is associated with a client or user of the client. If a geographic location is associated with a client or user of the client, the method further includes retrieving location information from a user profile or user account of the user, and comparing the search query against a first set of terms associated with a secondary database, and when the comparison meets a predefined criteria, searching the secondary database to generate a secondary set of search results that match the search query. The secondary search results correspond to one or more locations associated with the respective geographic location associated with a client or a user of the client and include links to additional information about the one or more locations. If a geographic location is not associated with the client or user of the client, the method further includes comparing the search query against a second set of terms associated with the secondary database, and when the comparison meets a predefined criteria, requesting and receiving a geographic location from the user of the client, and searching the secondary database to generate a secondary set of search results that match the search query and correspond to one or more locations associated with the received geographic location. The secondary search results including links to additional information about the one or more locations. The method further includes sending at least a subset of the primary set of search results and at least a subset of the secondary set of search results, if any, to the client.

In accordance with some embodiments of the present invention, a system for presenting search results includes memory, one or more processors, and one or more programs stored in memory and configured for execution by the one or more processors. The one or more programs include: instructions for sending to a server a search query, wherein the search query does not include any term that identifies a geographic location; and instructions for receiving a set of search results corresponding to a search query. The search results include first results and second results. The first results match the search query. Each first result corresponds to one or more locations associated with a respective geographic location and include links to additional information about the one or more locations. The respective geographic location is associated with a client or a user of the client. The second results correspond to Internet accessible documents that satisfy the search query and include links to the Internet accessible documents that satisfy the search query. The system further includes instructions for presenting the first results and second results in a single web browser window.

In accordance with some embodiments of the present invention, a system for presenting search results includes memory, one or more processors, and one or more programs stored in memory and configured for execution by the one or more processors. The one or more programs include: instructions for receiving from a client a search query, wherein the search query does not include any term that identifies a geographic location; and instructions for sending to a client a set of search results corresponding to a search query. The search results include first results and second results. The first results match the search query. Each first result corresponds to one or more locations associated with a respective geographic location and include links to additional information about the one or more locations. The respective geographic location is associated with a client or a user of the client. The second results correspond to Internet accessible documents that satisfy the search query and include links to the Internet accessible documents that satisfy the search query.

In accordance with some embodiments of the present invention, a system for presenting search results includes memory, one or more processors, and one or more programs stored in memory and configured for execution by the one or more processors. The one or more programs includes instructions for receiving from a client a search query, wherein the query does not include any term that identifies a geographic location; instructions for searching a primary database to generate a primary set of search results; instructions for comparing the search query against one or more lists of terms associated with a secondary database, and when the comparison meets a predefined criteria, searching the secondary database to generate a secondary set of search results that match the search query. The secondary search results correspond to one or more locations associated with a respective geographic location and include links to additional information about the one or more locations. The respective geographic location is associated with a client or a user of the client. The system further includes instructions for sending at least a subset of the primary set of search results and at least a subset of the secondary set of search results to the client.

In accordance with some embodiments of the present invention, a system for presenting search results includes memory, one or more processors, and one or more programs stored in memory and configured for execution by the one or more processors. The one or more programs include: instructions for receiving from a client a search query, wherein the query does not include any term that identifies a geographic location; instructions for searching a primary database to generate a primary set of search results that match the search query; and instructions for determining whether a geographic location is associated with the client or a user of the client. The system also includes instructions, which are executed if a geographic location is associated with the client or the user of the client, for retrieving location information from a user profile of the user or a cookie received from the client, and for comparing the search query against a first set of terms associated with a secondary database, and when the comparison meets a predefined criteria, searching the secondary database to generate a secondary set of search results that match the search query. The secondary search results correspond to one or more locations associated with the geographic location associated with the client or the user of the client and include links to additional information about the one or more locations. The system also includes instructions, which are executed if a geographic location is not associated with the client or the user of the client, for comparing the search query against a second set of terms associated with the secondary database, and instructions that are executed when the comparison meets a predefined criteria, for requesting and receiving a geographic location from the user of the client; and for searching the secondary database to generate a secondary set of search results that match the search query and that correspond to one or more locations associated with the received geographic location. The secondary search results also include links to additional information about the one or more locations. The system also includes instructions for sending at least a subset of the primary set of search results and at least a subset of the secondary set of search results, if any, to the client.

In accordance with some embodiments of the present invention, a computer readable storage medium, for use in conjunction with a computer system, includes one or more programs executable by the a processor of the computer system. The one or more programs include: instructions for sending to a server a search query, wherein the search query does not include any term that identifies a geographic location; and instructions for receiving a set of search results corresponding to a search query. The search results include first results and second results. The first results match the search query. Each first result corresponds to one or more locations associated with a respective geographic location and include links to additional information about the one or more locations. The respective geographic location is associated with a client or a user of the client. The second results correspond to Internet accessible documents that satisfy the search query and include links to the Internet accessible documents that satisfy the search query. The computer program product also includes instructions for presenting the first results and second results in a single web browser window.

In accordance with some embodiments of the present invention, a computer readable storage medium, for use in conjunction with a computer system, includes one or more programs executable by the a processor of the computer system. The one or more programs include: instructions for receiving from a client a search query, wherein the search query does not include any term that identifies a geographic location; and instructions for sending to a client a set of search results corresponding to a search query. The search results include first results and second results. The first results match the search query. Each first result corresponds to one or more locations associated with a respective geographic location and include links to additional information about the one or more locations. The respective geographic location is associated with a client or a user of the client. The second results correspond to Internet accessible documents that satisfy the search query and include links to the Internet accessible documents that satisfy the search query.

In accordance with some embodiments of the present invention, a computer readable storage medium, for use in conjunction with a computer system, includes one or more programs executable by the a processor of the computer system. The one or more programs include: instructions for receiving from a client a search query, wherein the query does not include any term that identifies a geographic location; instructions for searching a primary database to generate a primary set of search results that match the search query; and instructions for comparing the search query against one or more lists of terms associated with a secondary database, and when the comparison meets a predefined criteria, searching the secondary database to generate a secondary set of search results that match the search query. The secondary search results correspond to one or more locations associated with a respective geographic location, wherein the respective geographic location is associated with a client or a user of the client, and include links to additional information about the one or more locations. The computer program product also includes instructions for sending at least a subset of the primary set of search results and at least a subset of the secondary set of search results to the client.

In accordance with some embodiments of the present invention, a computer readable storage medium, for use in conjunction with a computer system, includes one or more programs executable by the a processor of the computer system. The one or more programs include: instructions for receiving from a client a search query, wherein the query does not include any term that identifies a geographic location; instructions for searching a primary database to generate a primary set of search results; and instructions for determining whether a geographic location is associated with the client or a user of the client. The computer program product also includes instructions, which are executed if a geographic location is associated with the client or the user of the client, for retrieving location information from a user profile of the user or from a cookie received from the client, and for comparing the search query against a first set of terms associated with a secondary database, and when the comparison meets a predefined criteria, searching the secondary database to generate a secondary set of search results that match the search query. The secondary search results correspond to one or more locations associated with the geographic location associated with the client or the user of the client and include links to additional information about the one or more locations. The computer program product also includes instructions, which are executed if a geographic location is not associated with the client or the user of the client, for comparing the search query against a second set of terms associated with the secondary database, and when the comparison meets predefined criteria, requesting and receiving a geographic location from the user of the client. The computer program products further includes instructions for searching the secondary database to generate a secondary set of search results that match the search query and that correspond to one or more locations associated with the received geographic location. The secondary search results include links to additional information about the one or more locations. The computer program product also includes instructions for sending at least a subset of the primary set of search results and at least a subset of the secondary set of search results, if any, to the client.

BRIEF DESCRIPTION OF THE DRAWINGS

Like reference numerals refer to corresponding parts throughout the drawings.

DETAILED DESCRIPTION OF THE INVENTION

Figure 1:
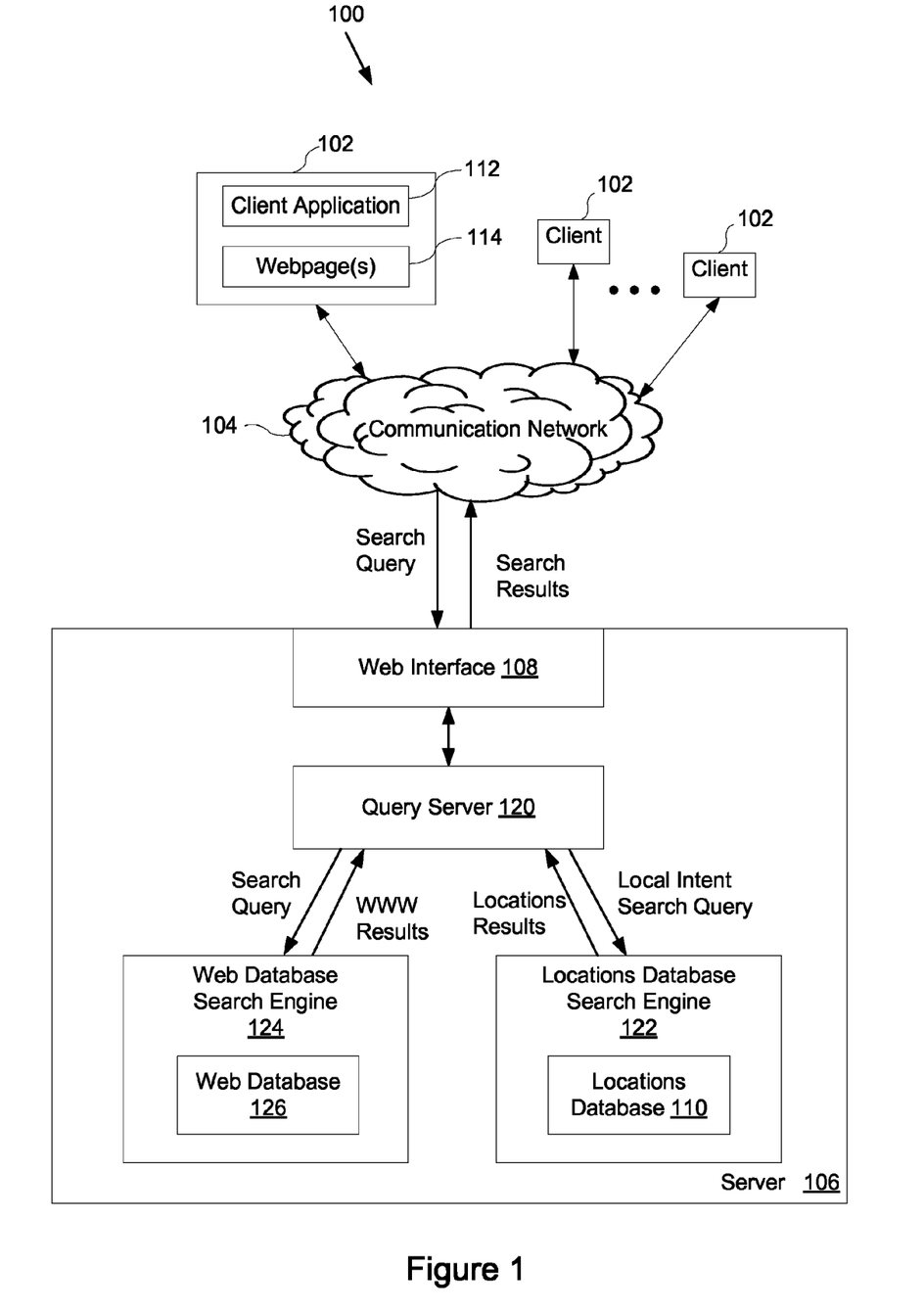
FIG. 1 is a block diagram of a system for implementing some embodiments of the present invention.

FIG. 1 is a block diagram of a system 100 for implementing some embodiments of the present invention. One or more client computers or devices 102 (hereinafter "clients") and a server 106 are connected to a communication network 104.

The server 106 may include a web interface 108, a query server 120, a web database search engine 124 and a locations database search engine 122. The web database search engine 124 is sometimes herein called a primary search engine and the locations database search engine 122 is sometimes herein called a secondary search engine.

The web interface 108 facilitates communication between the server 106 and the communication network 104. The web interface 108 allows for the transfer of information from the server 106 to the communication network 104 to be displayed by a client application 112 executed by a client 102. The web database search engine 124 (also called an Internet search engine) receives search queries from query server 120 and sends results to the query server 120. The web database search engine 124 includes a web database 126 (also sometimes herein called a primary database), which stores information associated with information available on the World Wide Web. The locations database search engine 122 also receives search queries from the query server 120 and sends local search results to the query server 120. The locations database search engine 122 includes a locations database 110, which stores information associated with locations related to local search results. The locations database 110 is sometimes herein called a secondary database.

The locations database search engine 122 also serves as an online application, which services client requests (which may be called local result queries) for information about locations. As discussed below, the locations database search engine 122 may store address information or any additional information about "places" or "locations," which may include stores, businesses, other organizations (e.g., governmental and non-governmental organizations, departments, and so on), parks, buildings, geographic features and so on.

The client 102 may be any of a number of devices (e.g. a computer, an internet kiosk, a personal digital assistant, a cell phone, a desktop computer, or a laptop computer) and can include a client application 112 that permits a user to view web pages 114 or other documents or information. The client application 112 may be a software application that permits a user to interact with the client 102 and/or network resources to perform one or more tasks. For example, the client application 112 may be a web browser (e.g., Firefox, Internet Explorer or Safari) or other type of application that permits a user to search for, browse, and/or use resources, such as one or more web pages 114, on the client 102 and/or accessible via the communication network 104.

The communication network 104 may be a local area network (LAN), a metropolitan area network, a wide area network (WAN), such as an intranet, an extranet, or the Internet, or any combination of such networks. It is sufficient that the communication network 104 provides communication capability between the clients 102 and the server 106. In some embodiments, the communication network 104 uses HyperText Transport Protocol (HTTP) and/or Transmission Control Protocol/Internet Protocol (TCP/IP) to transport information. The HTTP permits client computers to access various resources available via the communication network 104. The various embodiments of the invention, however, are not limited to the use of any particular protocol. The term "resource" as used throughout this specification refers to any document, object, information item, set of information, or service that is accessible via a Uniform Resource Locator (URL) and can be, for example, a web page, a text or word processing document, an email message, a transcribed voice message, a database, an image, or a computational object.

Figure 2A:
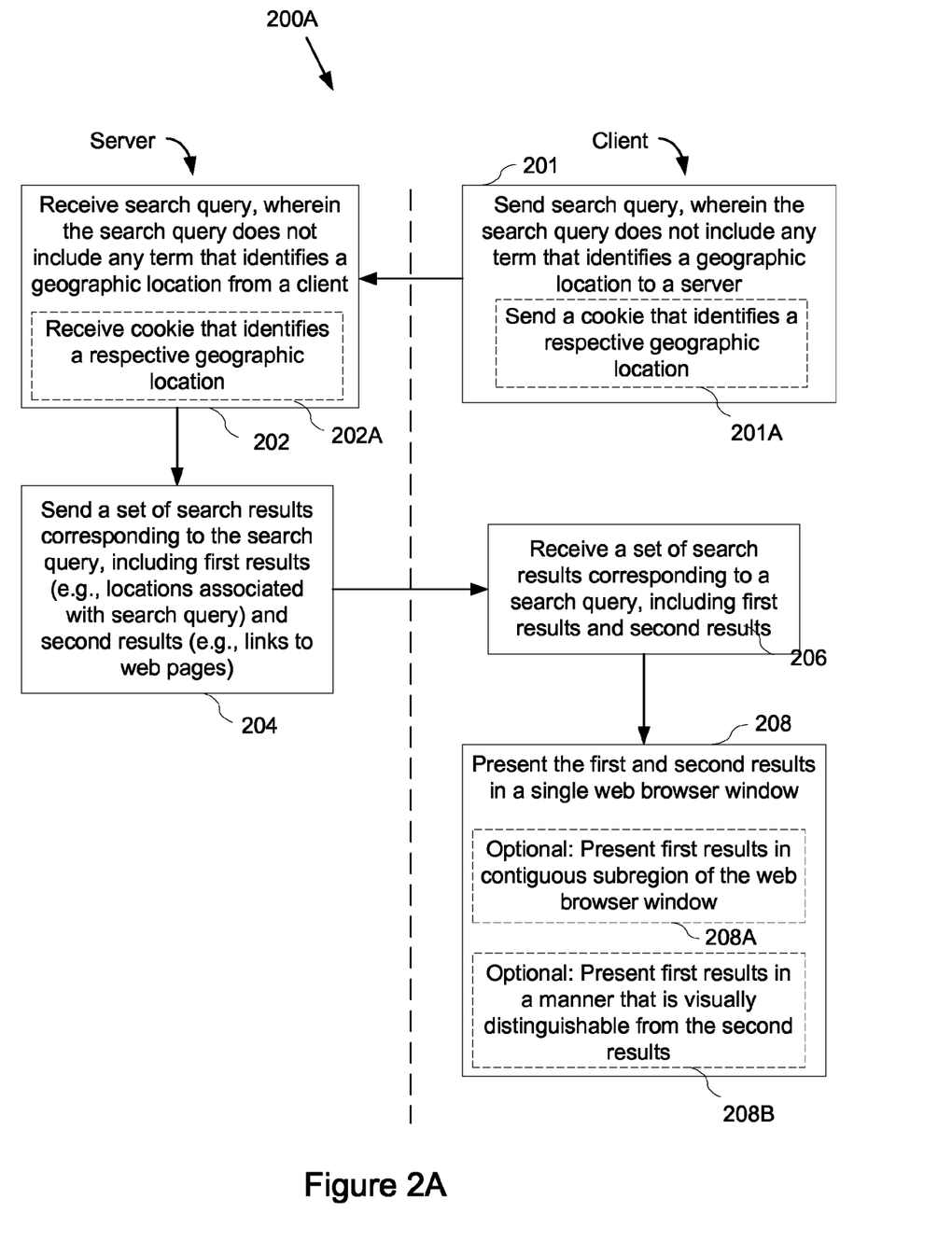
FIGS. 2A-2C are flow diagrams of a process for presenting search results according to an embodiment of the present invention.
Figure 2B:
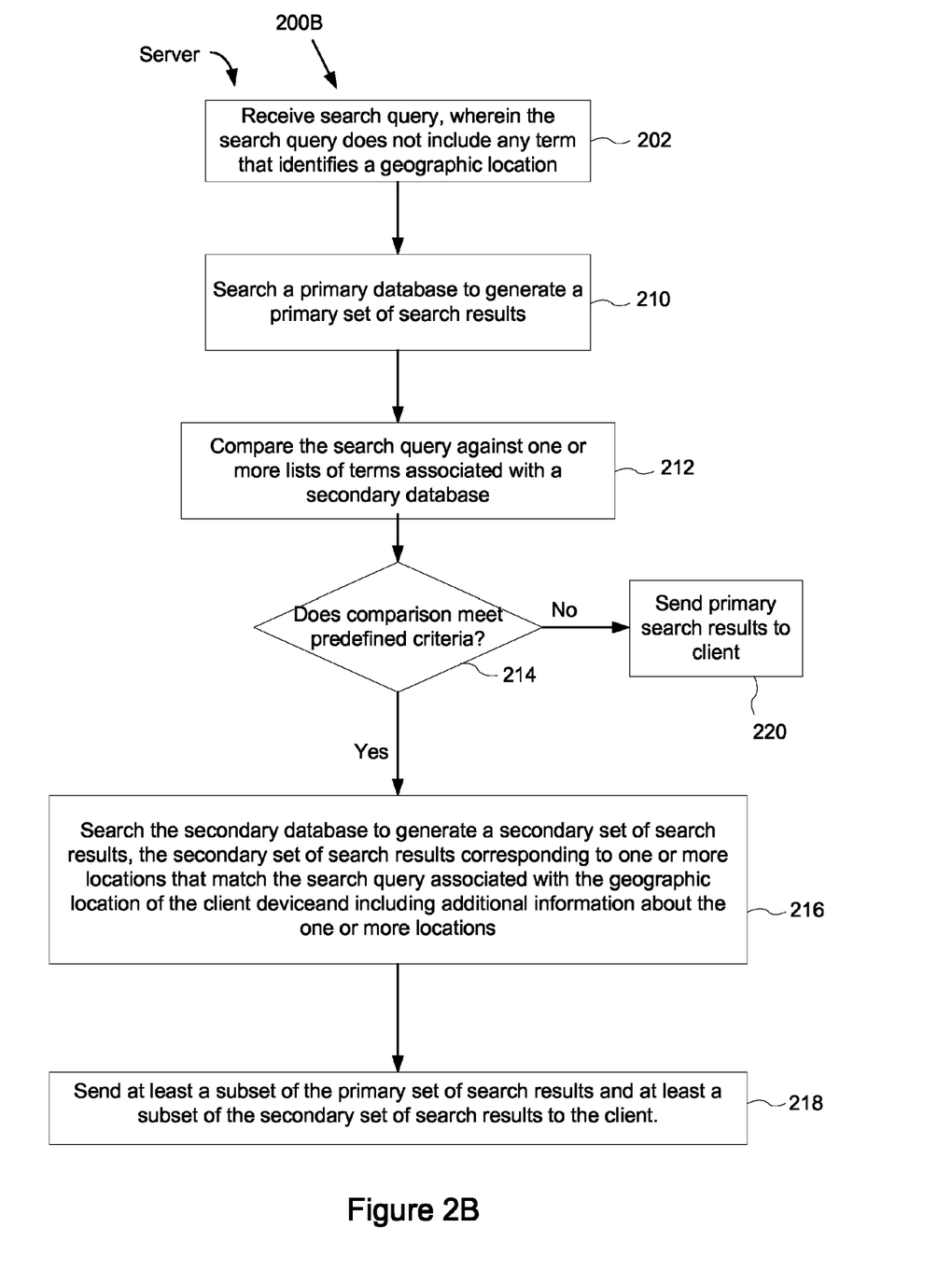
Figure 2C:
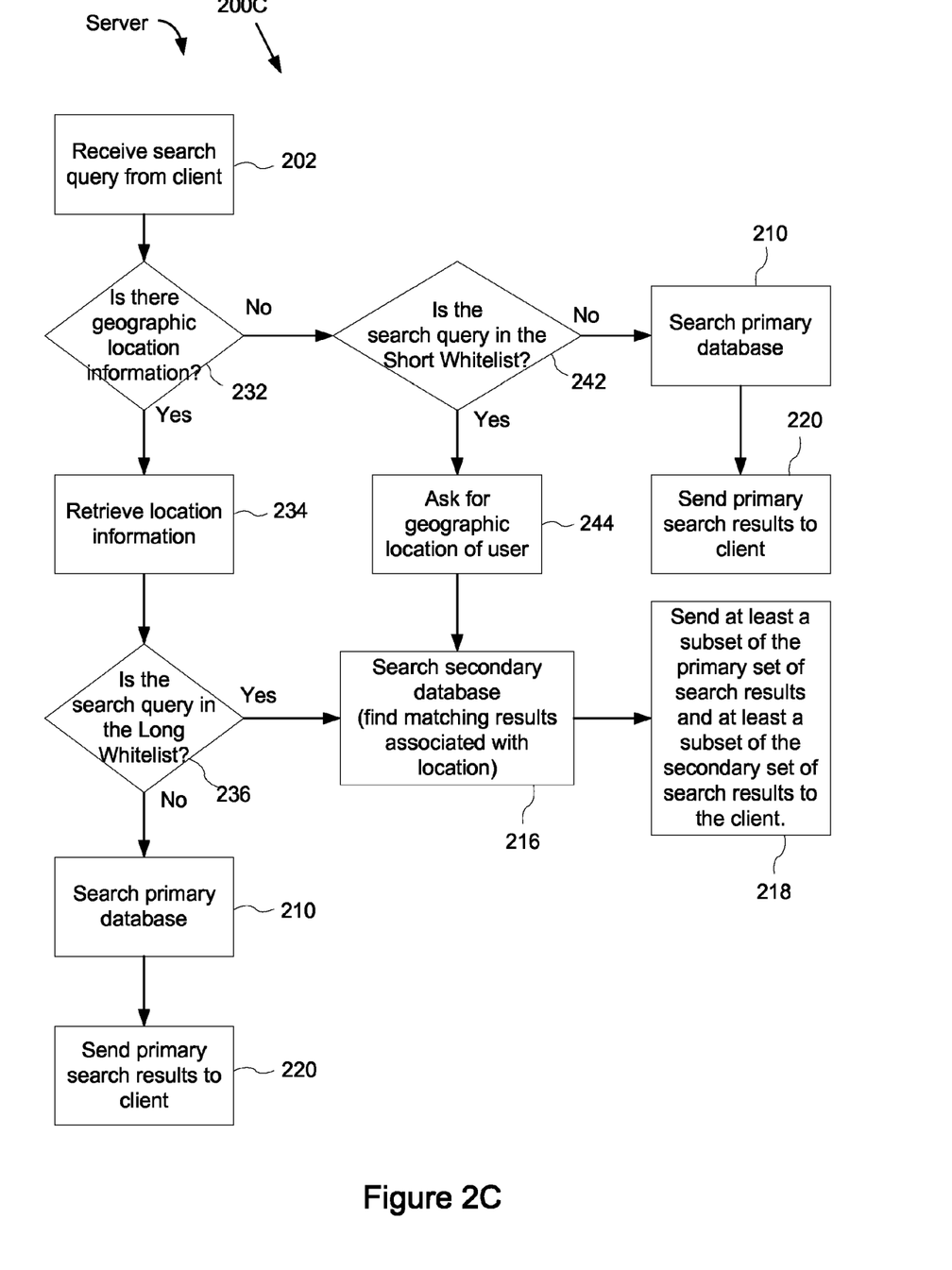

FIGS. 2A-2C are flow diagrams of a process for presenting search results according to an embodiment of the present invention. FIG. 2A is a flow diagram of a process 200 for presenting search results. The process 200A occurs between a server and a client, where the client includes a client application that permits a user to view web pages or other documents or information. The process 200A begins when a client sends a search query to a server (201), and the server receives the search query from the client (202). In some embodiments, the client also sends a cookie that identifies a respective geographic location (201A) associated with the client or user of the client. The search query is typically input by a user of a client device and does not include any term that identifies a geographic location. However, in some embodiments, when the search query is sent by the client to the server, it may optionally be accompanied by a cookie that identifies a respective geographic location. The geographic location information in the cookie is typically derived by the server from a prior interaction between the client and server, for example a session in which the user of the client specifies the user's geographic location. In the course of the prior interaction between the client and server, the server stores the geographic location information in the cookie and sends the cookie to the client, for example to a browser application in the client. The browser application automatically returns a copy of the cookie each time it sends an HTTP request from the client to the server.

The server processes the search query and sends a set of search results corresponding to the search query (204). The search results include first results and second results. The first results may, for example, include information identifying locations associated with the search query. The second results may, for example, include information identifying web pages or other documents that match the search query, and may include links to the identified web pages.

Figure 3A:
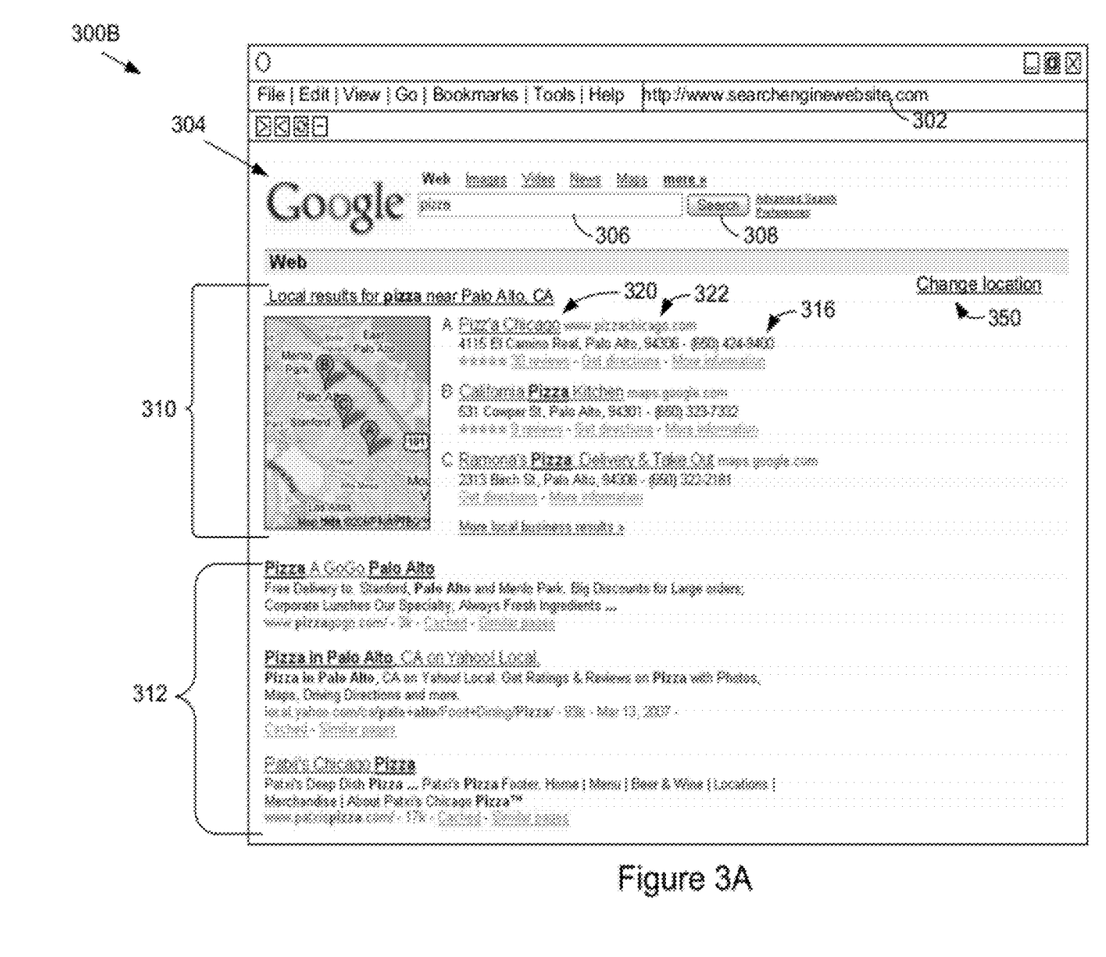
FIG. 3A is a schematic screenshot of a web browser presenting search results according to one embodiment of the present invention.
Figure 3B:
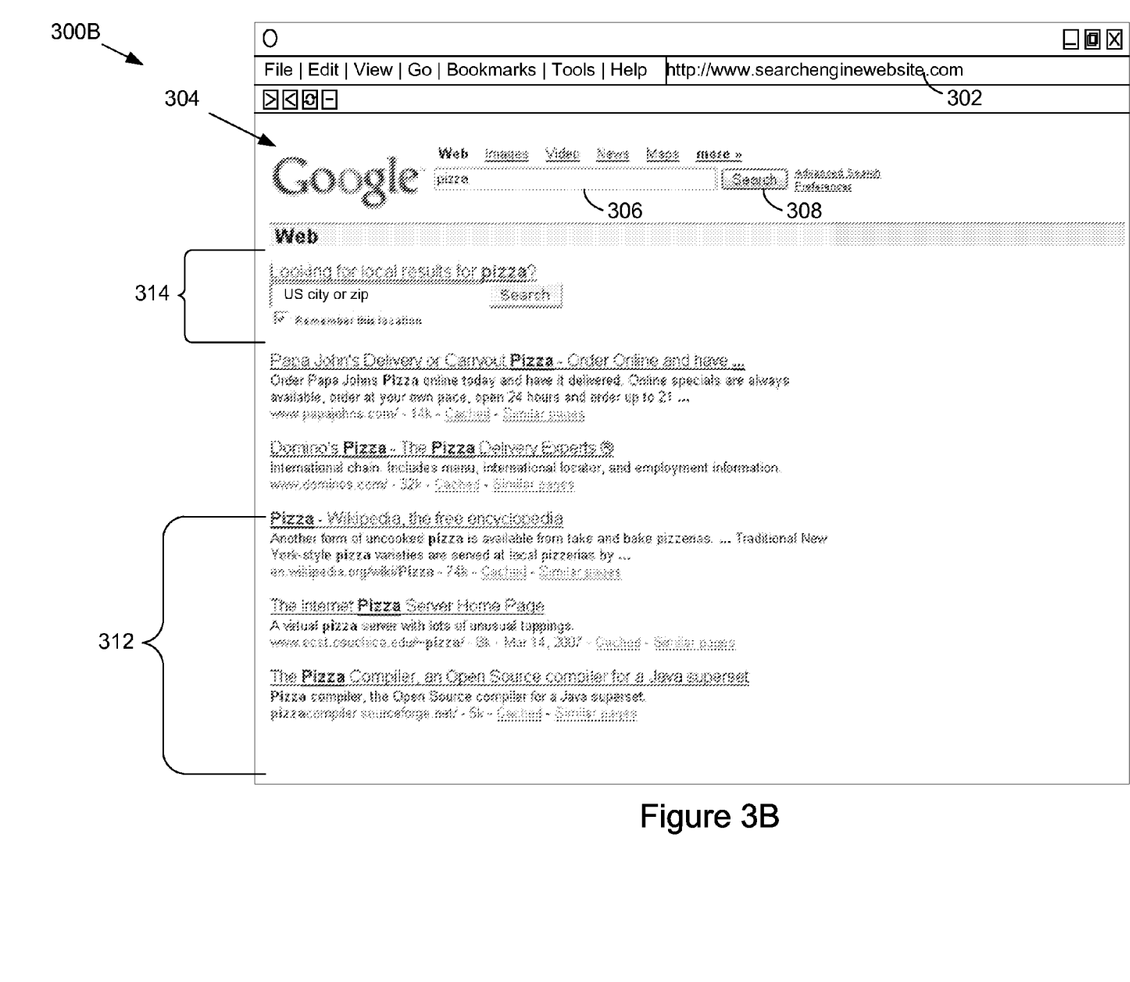
FIG. 3B is a schematic screenshot of a web browser presenting search results according to another embodiment of the present invention.

A client 102 receives the set of search results, including first results and second results (see, for example, first results 314 and second results 312 in FIGS. 3A and 3B), corresponding to the search query (206). The client then presents the first and second results (208) in a single web browser window. In some embodiments, the first results are presented in a continuous subregion (sometimes called a "OneBox" or "One Box") of the web browser window (208A). In other embodiments, the first results are presented in a manner that is visually distinguishable from the second results (208B). For example, in some embodiments, the first and second results are displayed in a list, and the first results are displayed above the second results on the list. In some embodiments, the second results are displayed in a second region of the web browser window that excludes the contiguous sub-region of the web browser window in which the first results are displayed.

FIG. 2B is a flow diagram of a process 200B for generating search results and sending at least a subset of the search results to a client, according to another embodiment of the present invention. The process 200B occurs at a server. The process 200B begins when a server receives a search query (202). For example, the search query may be input by a user of a client device, which transmits the search query to the server via the communication network 104 (FIG. 1). The search query does not include any term that identifies a geographic location. The server processes the search query by searching a primary database to generate a primary set of search results (210). The search query is also compared against one or more lists of terms associated with a secondary database (212). If the comparison does not meet predefined criteria (214—No), only the primary database is searched (using the search query) to generate a primary set of search results (210), and the primary search results are sent to a client device (220).

If the comparison does meet predefined criteria (214—Yes), a secondary database is searched (using the search query) to generate a secondary set of search results (216). The secondary set of search results correspond to one or more locations that match the search query associated with the geographic location of the client device and include additional information about the one or more locations. The additional information may include additional search results, and/or may include address information for at least one location. In some embodiments, the additional information may also include links to an online application. At least a subset of the primary set of search results (e.g., a list of web pages and/or links to web pages) and the secondary set of search results (e.g., local search results) is sent to the client (218). The secondary set of search results are sometimes herein called "first results," and the primary set of search results are sometimes herein called "second results."

Similar to the process 200A described above, the client 102 receives the set of search results, including first results and second results, corresponding to the search query 206. The client then presents the first and second results 208 in a single web browser window. In some embodiments, the first results are presented in a continuous subregion (e.g., displayed in a "OneBox") of a single web browser window 208A. In other embodiments, the first results are presented in a manner that is visually distinguishable from the second results 208B. For example, in some embodiments, the first and second results are displayed in a list, and the first results are displayed above the second results on the list.

FIG. 2C is a flow diagram of a process 200C for processing search queries in accordance with some embodiments of the present invention. The process 200C occurs at a server. The process 200C occurs between the search of the primary database 210 and the inquiry 214 (FIG. 2B) in order to determine whether the comparison of the search query meets a predefined criteria. After a search query, which does not include any term that identifies a geographic location, is received from a client (202), a determination is made as to whether there is geographic location information associated the client (232). In some embodiments, the geographic information may be associated with the user of the client. If there is geographic information available (232—Yes), the location information is retrieved (234).

In some embodiments, a determination is also made to determine whether a user of the client is logged into a service, and when the user of the client is logged into the service, geographic location associated with the user (if any) is retrieved from a user profile of the user.

In some embodiments, one or more lists of terms includes a first set of terms (sometimes herein called a Long Whitelist) associated with terms that signify local intent. Such terms would be those terms that a user inputs that may indicate the user desires localized search results. For example, if a user inputs "pizza" as a search query, this is highly indicative that the user desires search results of local pizza shops, rather than search results directed to general information related to pizza. In some other embodiments, the one or more lists of terms includes a second set of terms (sometimes herein called a Short Whitelist) associated with terms that also signify local intent. As described below, the Short Whitelist is searched when geographic location information associated with either the user or client is not found when the server first receives the search query. These lists are utilized to allow a user to enter a search term, desiring a localized search result, without having also enter any location within the search query.

In some embodiments, the first set of terms includes a plurality of terms not included in the second set of terms. In some embodiments, the first set of terms includes at least 100 terms not included in the second set of terms. In some embodiments, the first set of terms includes at least 500 terms not included in the second set of terms. In some embodiments, the first set of terms includes at least 1000 terms not included in the second set of terms.

A determination is then made as to whether the search query is in a Long Whitelist (236). If the query is not in the Long Whitelist (236—No), only the primary database is searched (210) and the primary search results are sent to the client (220). If the query is in the Long Whitelist (236—Yes), a secondary database is searched in order to find matching results associated with the geographic location (216) and at least a subset of the primary set of search results and at least a subset of the secondary set of search results (if any) is sent to the client (218). Alternately, in some embodiments a search retrieval score or quality score is associated with each result in the secondary search result. In these embodiments, a subset of the secondary search results are sent to the client only if the score associated with one or more of the secondary search results exceeds a threshold value.

If there is no geographic information available for the user or client (232—No), a determination is made as to whether the search query is in the Short Whitelist (242). If the search query is not found in the Short Whitelist (242—No), only the primary database is searched (210) and the primary search results are sent to the client (220).

If the search query exists in the Short Whitelist (242—Yes), the server requests the geographic location of the user (244), as shown as item 314 in FIG. 3B. The user may respond to the request by providing the name of a city, state, country, or other region. In some other embodiments, a postal code (e.g., a zip code) or other geographical location code may be input by the user. In some other embodiments, any other equivalent terms may be used to represent a geographic location. The secondary database is then searched in order to find matching results associated with the inputted location (216). At least a subset of the secondary set of search results (if any) are sent to the client (218). In some embodiments, when the user explicitly provides location information (244), instead of showing a list of search results as in FIG. 3A, the server sends to the client for display a map with a listing of at least some of the secondary search results and the locations of those results shown on the map. In some other embodiments, at least a subset of the secondary set of search results (if any) and at least a subset of the primary set of search results are sent to the client. As mentioned above, the client receives the set of search results (206, FIG. 2A) and presents the results in a single web browser window (208, FIG. 2A). As noted above, in some embodiments the secondary search results, or a subset thereof, are returned to the client only if a quality score or information retrieval score associated with one or more of the secondary search results exceeds a threshold value.

FIG. 3A is a schematic screenshot 300A of the display (i.e., user interface) produced by a web browser presenting search results according to one embodiment of the present invention. The user interface 304 (also known as a webpage) can be produced by any type of browser (e.g., a web browser) that permits a user to display and interact with web pages or other documents or information. The user interface 304 includes a URL field 302 for entering the URL of any web page that a user wants to display, as well as for displaying the URL of the web page currently being displayed. As illustrated in this figure, the user interface 304 displays an exemplary web page 304. Webpage 304 includes a search field 306 with a corresponding search button 308 for initiating a search for information corresponding to the search query in the search field 306.

When a user enters a search query in the search field 306 and selects the corresponding search button 308 to initiate a search, the web browser (i.e., the user interface 304 of the web browser) presents first results 310 and second results 312, even if the search query does not include any term that identifies a geographic location, so long as a geographic location can be associated with the client or user of the client, and the search query is found in a Long Whitelist, as described above.

In some embodiments, the geographic location is associated with a user profile of the user of the client. In some embodiments, the geographic location is identified in a cookie that is sent by the client, along with the search query, to the server.

In some embodiments, the first results 310 are presented in a contiguous sub-region of the web browser window, in a manner that is visually distinguished from the second results 312. In some embodiments, the first results 310 and second results 312 are displayed in a list and the first results 310 are displayed above the second results 312 in the list.

In some embodiments, the first results 310 include additional information. In some embodiments, the additional information includes address information and/or telephone number information 316 for at least one location 320. In some embodiments, at least one of the first results 310 includes a link 322 to an online application. In some embodiments, when a user activates the link (e.g., by clicking on the link, thereby causing the client to send an HTTP request to a server associated with the online application) the online application sends information to the client and the client processes the additional information for presentation. In some embodiments, a user may also change the location associated with the search results by selecting the change location link 350.

FIG. 3B schematic screenshot 300B of the display (i.e., user interface) produced by a web browser presenting search results according to some embodiments of the present invention. Similar to the previous figure, FIG. 3B includes a user interface (also known as a web page) that can be produced by any type of browser (e.g., a web browser) that permits a user to display and interact with web pages or other documents or information. The user interface 304 includes a URL field 302 for entering the URL of any web page that a user wants to display, as well as for displaying the URL of the web page currently being displayed. As illustrated in this figure, the user interface 304 displays an exemplary web page. Web page 304 includes a search field 306 with a corresponding search button 308 for initiating a search for information corresponding to the search query in the search field 306.

When a user enters a search query in the search field 306 and selects the corresponding search button 308 to initiate a search, the web browser (i.e., the user interface 304 of the web browser) presents a geographic location inquiry area 314 and second results 312 when the search query does not include any term that identifies a geographic location, there is no geographic location associated with the client or user of the client, but the search query is found in a Short Whitelist, as described above.

Figure 4:
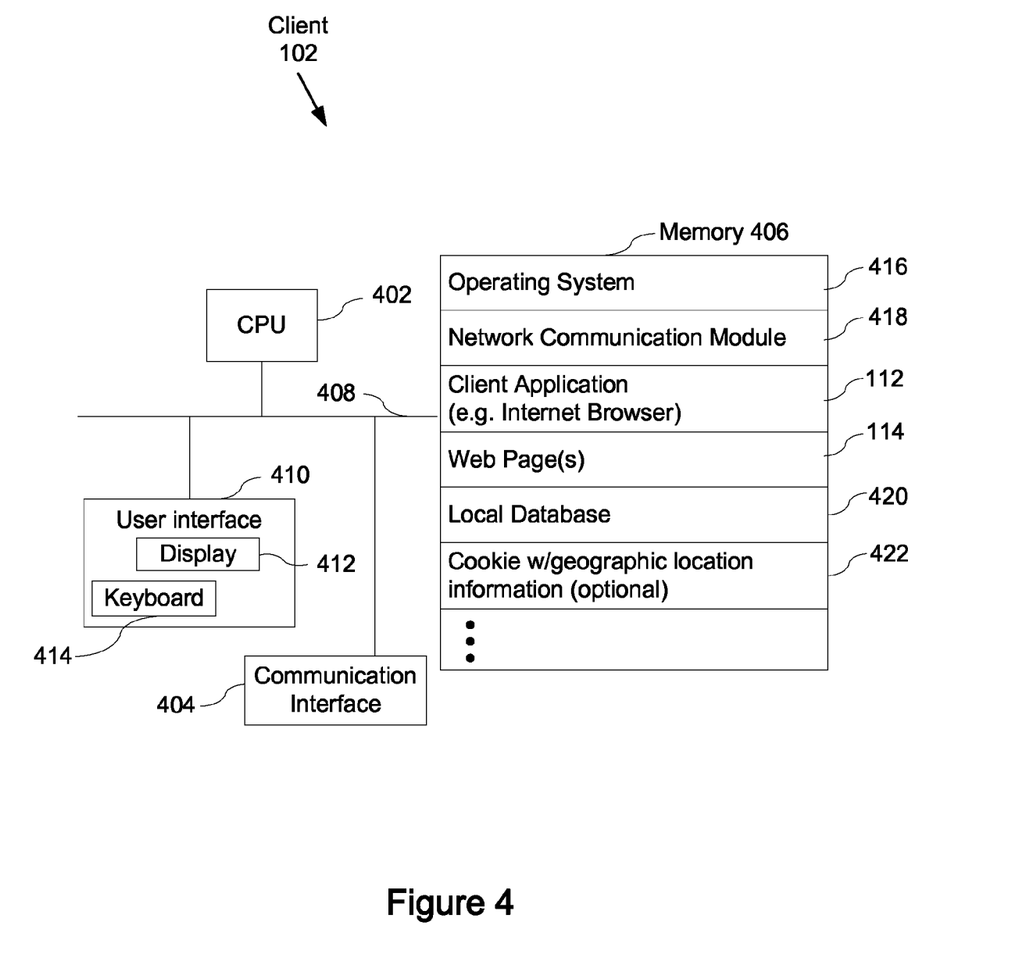
FIG. 4 is a block diagram of an exemplary client computer or device in accordance with some embodiments of the present invention.

FIG. 4 is a block diagram of an exemplary client computer 102 or device in accordance with some embodiments of the present invention. The client 102 typically includes one or more processing units (CPUs) 402, one or more network or other communications interfaces 404, memory 406, and one or more communication buses 408 for interconnecting these components. The communication buses 408 may include circuitry (sometimes called a chipset) that interconnects and controls communications between system components. The client 102 optionally may include a user interface 410 comprising a display device 412 and a keyboard 414. Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. In some embodiments, memory 406 stores the following programs, modules and data structures, or a subset thereof:

- an operating system 416 that includes procedures for handling various basic system services and for performing hardware dependent tasks;
- a network communication module 418 that is used for connecting the client 102 to other computers via the one or more communication network interfaces 604 and one or more communication networks, such as the Internet, other wide area networks, local area networks, metropolitan area networks, and so on;
- a client application 112 (e.g., a browser application) that permits a user of the client to search for, browse, and/or use resources, such as one or more web pages 114, on the client 102 and/or accessible via the communication network 104 (FIG. 1);
- one or more web pages 114 that may be displayed by the client application 112;
- optionally, a local database 420 for storing information, such as local results information; and
- optionally, a cookie 422 that includes geographic location information associated with the client or a user of the client.

Figure 5A:
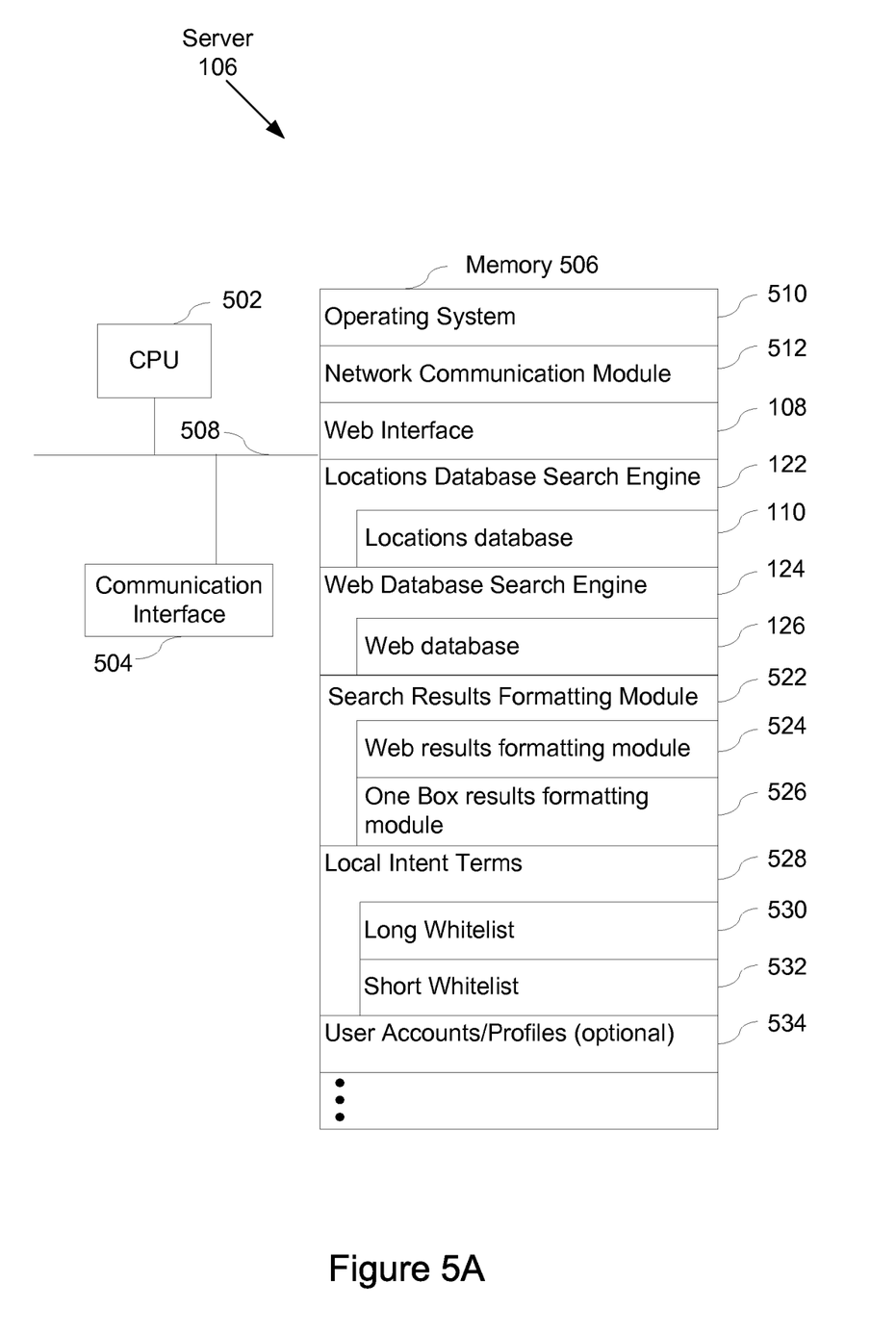
FIG. 5A is a block diagram of an exemplary server in accordance with some embodiments of the present invention.

FIG. 5A is a block diagram of an exemplary server 106 in accordance with some embodiments of the present invention. The server 106 typically includes one or more processing units (CPUs) 502, one or more network or other communication interfaces 504, memory 506, and one or more communication buses 508 for interconnecting these components. The communication buses 508 may include circuitry (sometimes called a chipset) that interconnects and controls communications between system components. The server 106 optionally may include a user interface (not shown). Memory 506 includes high speed random access memory, such as DRAM, SRAM, DDR RAM or other random access solid state storage devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. In some embodiments, memory 506 stores the following programs, modules, data structures, or a subset thereof:

- an operating system 510 that includes procedures for handling various basic system services and for performing hardware dependant tasks;
- a network communication module 512 that is used for connecting the server 106 to other computers via the one or more communication network interfaces 504 and one or more communication networks, such as the Internet, other wide area networks, local area networks, metropolitan area networks, and so on;
- a web interface 108 for facilitating communication between the server 106 and the communication network 104; in some embodiments, the web interface 108 and the network communication module may be one and the same;
- a locations database search engine 122;
- a web search engine 124;
- a search results formatting module 522 that includes a web results formatting module 524 and a One Box results formatting module 526;
- a database of local intent terms 528 that includes one or more Long Whitelist databases 530 for storing Long Whitelist terms and phrases and one or more Short Whitelist databases 532 for storing Short Whitelist terms and phrases; and
- optionally, user accounts or user profiles 532, some of which may include geographic location information for one or more users.

As described above, the web interface 108 facilitates communication between the server 106 and the communication network 104 and allows for the transfer of information from the server 106 to the communication network 104 to be displayed on a client application 112 of a client 102. The locations database search engine 122 is for conducting searches of the local intent terms database. The web database search engine 124 is for conducting searches of the web database.

The locations database search engine 122 includes a locations database 110 and the web database search engine 124 includes a web database 126.

Memory 506 may also include a search results formatting module 522. The search results formatting module 522 formats the results of a search query into first results and second results and includes a web results formatting module 524 (for formatting search results from the web database search engine 122 for presentation to a user) and a One Box results formatting module 526 (for formatting search results from the locations database search engine 122 for presentation to the user).

Figure 5B:
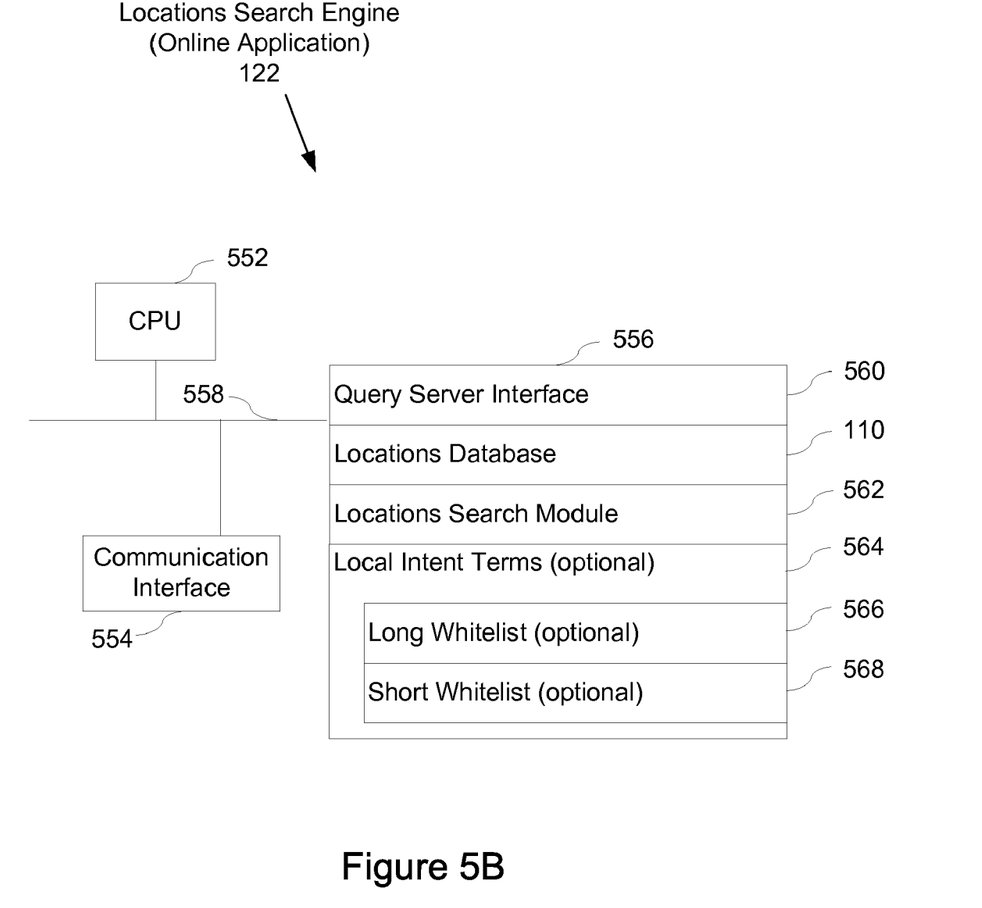
FIG. 5B is a block diagram of an exemplary locations database search engine in accordance with some embodiments of the present invention.

FIG. 5B is a block diagram of an exemplary locations database search engine 122 in accordance with some embodiments of the present invention. The locations database search engine 122 typically includes one or more processing units (CPUs) 552, one or more network or other communication interfaces 554, memory 556, and one or more communication buses 558 for interconnecting these components. The communication buses 558 may include circuitry (sometimes called a chipset) that interconnects and controls communications between system components. The locations database search engine 122 optionally may include a user interface (not shown). Memory 556 includes high speed random access memory, such as DRAM, SRAM, DDR RAM or other random access solid state storage devices; and may include non-volatile memory, such as one or more magnetic disk storage devices, optical disk storage devices, flash memory devices, or other non-volatile solid state storage devices. Memory 556 may optionally include one or more storage devices remotely located from the CPU(s) 552. In some embodiments, memory 556 stores the following programs, modules, data structures, or a subset thereof:

- query server interface 560 for receiving queries from another server, such as a query server 120 (FIG. 1), and returning search results to that other server;
- a locations database 110 for storing information related to various locations; and
- a locations search module 562 for conducting searches of the locations database 110.

In some embodiments, memory 556 may optionally include one or more location intent terms databases 564, which may optionally include one or more Long Whitelist databases 566 and/or one or more Short Whitelist databases 568.

Each of the above identified elements in FIGS. 4, 5A and 5B may be stored in one or more of the previously mentioned memory devices, and corresponds to a set of instructions for performing a function described above. The above-identified modules or programs (i.e., sets of instructions) need not be implemented as separate software programs, procedures or modules, and thus various subsets of these modules may be combined or otherwise rearranged in various embodiments. In some embodiments, memory 406, 506, and 556 may sore a subset of the modules and data structures identified above. Furthermore memory 406, 506 and 556 may store additional modules and data structures not described above.

Although FIGS. 4, 5A and 5B show respectively a client 102, a server 106, and a locations database search engine 122, the figures are intended more as functional descriptions of the various features which may be present in a client and set of servers than as a structural schematic of the embodiments therein. In practice, and as recognized by those of ordinary skill in the art, items shown separately could be combined and come items could be separated. For example, some items shown separately in FIG. 5A could be implemented on a single server and single items could be implemented by one or more servers. The actual number of servers used to implement a server 106 and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer implemented method of presenting search results, comprising:
   on a server system having one or more processors and memory storing one or more programs executed by the one or more processors:
   receiving respective search queries from a plurality of respective clients;
   for each received respective search query that does not include any term that identifies a geographic location, performing a set of operations comprising:
      searching a primary database to generate a primary set of search results that match the search query;
      determining whether a geographic location is associated with a client or a user of the client;
      in accordance with a determination that a geographic location is associated with the client or the user of the client, retrieving location information from a user profile of the user, and
      comparing the search query against a first whitelist, but not a second whitelist, wherein the first whitelist includes a set of predefined terms associated with a secondary database, and conditionally, in accordance with a result of the comparison,
         searching the secondary database to generate a secondary set of search results that match the search query, the secondary search results corresponding to one or more physical locations associated with the respective geographic location associated with the client or the user of the client, the secondary search results including additional information about the one or more physical locations;
      in accordance with a determination that a geographic location is not associated with the client or the user of the client,
         comparing the search query against the second whitelist, but not the first whitelist, wherein the second whitelist includes a set of predefined terms associated with the secondary database, and wherein the first whitelist includes a plurality of terms not included in the second whitelist, and conditionally, in accordance with a result of the comparison,
            requesting and receiving a geographic location from the user of the client; and
            searching the secondary database to generate a secondary set of search results that match the search query and that correspond to one or more physical locations associated with the received geographic location, the secondary search results including additional information about the one or more physical locations; and
      sending at least a subset of the primary set of search results and at least a subset of the secondary set of search results, if any, to the client.

2. The method of claim 1, wherein the determining includes determining whether a user of the client is logged into a service, and when the user of the client is logged into the service, retrieving the geographic location from a user profile of the user.

3. A system for presenting search results, comprising:
   memory;
   one or more processors; and
   one or more programs stored in memory and configured for execution by the one or more processors, the one or more programs comprising:
   instructions for receiving respective search queries from a plurality of respective clients;
   instructions for performing a set of operations for each received respective search query that does not include any term that identifies a geographic location, the instructions comprising:
      instructions for searching a primary database to generate a primary set of search results that match the search query;
      instructions for determining whether a geographic location is associated with the client or a user of the client;
      instructions that are executed in accordance with a determination that a geographic location is associated with the client or the user of the client, including:
         instructions for retrieving location information from a user profile of the user or a cookie received from the client, and
         instructions for comparing the search query against a first whitelist, but not a second whitelist, wherein the first whitelist includes a set of predefined terms associated with a secondary database, and conditionally, in accordance with a result of the comparison, searching the secondary database to generate a secondary set of search results that match the search query, the secondary search results corresponding to one or more physical locations associated with the geographic location associated with the client or the user of the client and including additional information about the one or more physical locations;

instructions that are executed in accordance with a determination that a geographic location is not associated with the client or the user of the client, including:

instructions for comparing the search query against the second whitelist, but not the first whitelist, wherein the second whitelist includes a set of predefined terms associated with the secondary database, wherein the first whitelist includes a plurality of terms not included in the second whitelist, and instructions that are executed conditionally, in accordance with a result of the comparison, including:

instructions for requesting and receiving a geographic location from the user of the client; and instructions for searching the secondary database to generate a secondary set of search results that match the search query and that correspond to one or more physical locations associated with the received geographic location, the secondary search results including additional information about the one or more physical locations; and instructions for sending at least a subset of the primary set of search results and at least a subset of the secondary set of search results, if any, to the client.

4. A non-transitory computer readable storage medium for use in conjunction with a computer system having a processor, the computer readable storage medium comprising one or more programs executable by the processor, the one or more programs comprising:

instructions for receiving respective search queries from a plurality of respective clients;

instructions for performing a set of operations for each received respective search query that does not include any term that identifies a geographic location, the instructions comprising:

instructions for searching a primary database to generate a primary set of search results;

instructions for determining whether a geographic location is associated with the client or a user of the client;

instructions that are executed in accordance with a determination that a geographic location is associated with the client or the user of the client, including:

instructions for retrieving location information from a user profile of the user or from a cookie received from the client, and instructions for comparing the search query against a first whitelist, but not a second whitelist, wherein the first whitelist includes a set of predefined terms associated with a secondary database, and conditionally, in accordance with a result of the comparison, searching the secondary database to generate a secondary set of search results that match the search query, the secondary search results corresponding to one or more physical locations associated with the geographic location associated with the client or the user of the client, the secondary search results including additional information about the one or more physical locations;

instructions that are executed in accordance with a determination that a geographic location is not associated with the client or the user of the client, including:

instructions for comparing the search query against the second whitelist, but not the first whitelist, wherein the second whitelist includes a set of predefined terms associated with the secondary database, and wherein the first whitelist includes a plurality of terms not included in the second whitelist, and conditionally, in accordance with a result of the comparison, requesting and receiving a geographic location from the user of the client; and instructions for searching the secondary database to generate a secondary set of search results that match the search query and that correspond to one or more physical locations associated with the received geographic location, the secondary search results including additional information about the one or more physical locations; and instructions for sending at least a subset of the primary set of search results and at least a subset of the secondary set of search results, if any, to the client.

5. The method of claim 1, wherein sending the search results includes sending the subset of the secondary set of search results to be displayed in a contiguous sub-region of a web browser window that also displays the subset of the primary set of search results.

6. The method of claim 1, wherein sending the search results includes sending the subset of the secondary set of search results to be displayed in a list in a single web browser window, and wherein the subset of the secondary set of search results are to be displayed above the subset of the primary set of search results in the list.

7. The method of claim 1, wherein the additional information for at least one of the physical locations comprises address information and/or telephone number information.

8. The method of claim 1, wherein at least one of the subset of the secondary set of search results includes a link to an online application.

9. The method of claim 1, wherein the receiving includes receiving a cookie that identifies the geographic location.

10. The method of claim 1, wherein the first whitelist and the second whitelist include a set of predefined terms associated with local intent queries.

11. The system of claim 3, wherein the instructions for sending the search results includes instructions for sending the subset of the secondary set of search results to be displayed in a contiguous sub-region of a web browser window that also displays the subset of the primary set of search results.

12. The system of claim 3, wherein the instructions for sending the search results includes instructions for sending the subset of the secondary set of search results to be displayed in a list in a single web browser window, and wherein the subset of the secondary set of search results are to be displayed above the subset of the primary set of search results in the list.

13. The system of claim 3, wherein the additional information for at least one of the physical locations comprises address information and/or telephone number information.

14. The system of claim 3, wherein at least one of the subset of the secondary set of search results includes a link to an online application.

15. The system of claim 3, wherein the instructions for receiving includes instructions for receiving a cookie that identifies the geographic location.

16. The system of claim 3, wherein the first whitelist and the second whitelist include a set of predefined terms associated with local intent queries.

17. The system of claim 3, wherein the instructions for determining includes instructions for determining whether a user of the client is logged into a service, and when the user of the client is logged into the service, retrieving the geographic location from a user profile of the user.

18. The computer readable storage medium of claim 4, wherein the instructions for sending the search results includes instructions for sending the subset of the secondary set of search results to be displayed in a contiguous sub-region of a web browser window that also displays the subset of the primary set of search results.

19. The computer readable storage medium of claim 4, wherein the instructions for sending the search results includes instructions for sending the subset of the secondary set of search results to be displayed in a list in a single web browser window, and wherein the subset of the secondary set of search results are to be displayed above the subset of the primary set of search results in the list.

20. The computer readable storage medium of claim 4, wherein the additional information for at least one of the physical locations comprises address information and/or telephone number information.

21. The computer readable storage medium of claim 4, wherein at least one of the subset of the secondary set of search results includes a link to an online application.

22. The computer readable storage medium of claim 4, wherein the instructions for receiving includes instructions for receiving a cookie that identifies the geographic location.

23. The computer readable storage medium of claim 4, wherein the first whitelist and the second whitelist include a set of predefined terms associated with local intent queries.

24. The computer readable storage medium of claim 4, wherein the instructions for determining includes instructions for determining whether a user of the client is logged into a service, and when the user of the client is logged into the service, retrieving the geographic location from a user profile of the user.

\* \* \* \* \*